H. S. GRACE.
RESILIENT WHEEL TIRE.
APPLICATION FILED AUG. 1, 1917.

1,293,412.

Patented Feb. 4, 1919.
2 SHEETS—SHEET 1.

INVENTOR
H. S. GRACE

ATT'Y.

H. S. GRACE.
RESILIENT WHEEL TIRE.
APPLICATION FILED AUG. 1, 1917.
1,293,412.
Patented Feb. 4, 1919.
2 SHEETS—SHEET 2.
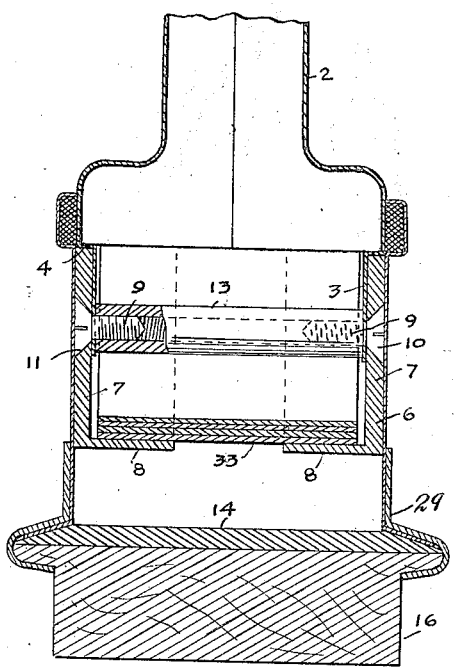
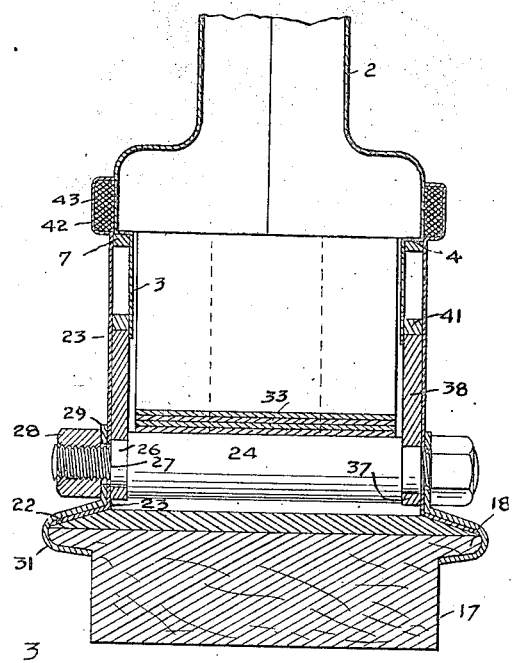
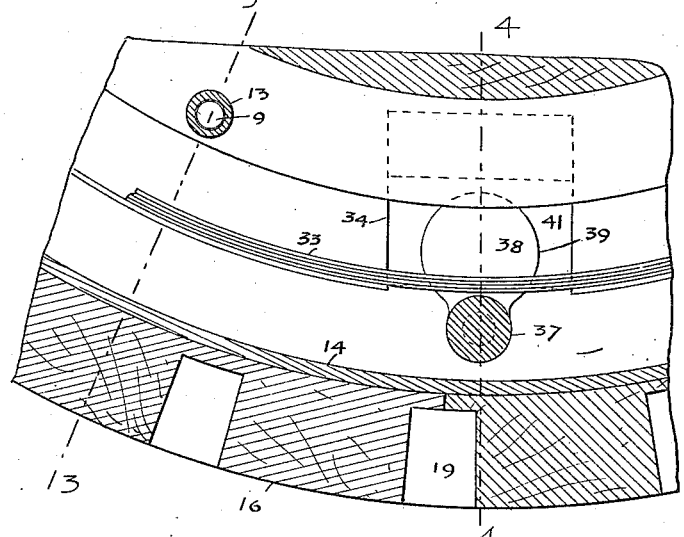
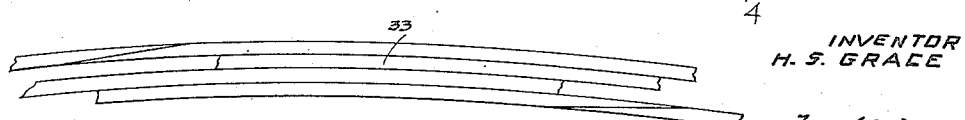
INVENTOR
H. S. GRACE
ATT'Y.

UNITED STATES PATENT OFFICE.

HENRY S. GRACE, OF SAN FRANCISCO, CALIFORNIA.

RESILIENT WHEEL-TIRE.

1,293,412.     Specification of Letters Patent.     Patented Feb. 4, 1919.

Application filed August 1, 1917. Serial No. 183,847.

*To all whom it may concern:*

Be it known that I, HENRY S. GRACE, a citizen of the United States, residing at San Francisco, in the county of San Francisco and State of California, have invented new and useful Improvements in Resilient Wheel-Tires, of which the following is a specification.

The object of the present invention is to provide a resilient tire for wheels which shall be free from the annoyances and disadvantages of pneumatic tires, and which will not detract from the transmission of the driving power from the central to the peripheral portion of the wheel.

Figure 1:
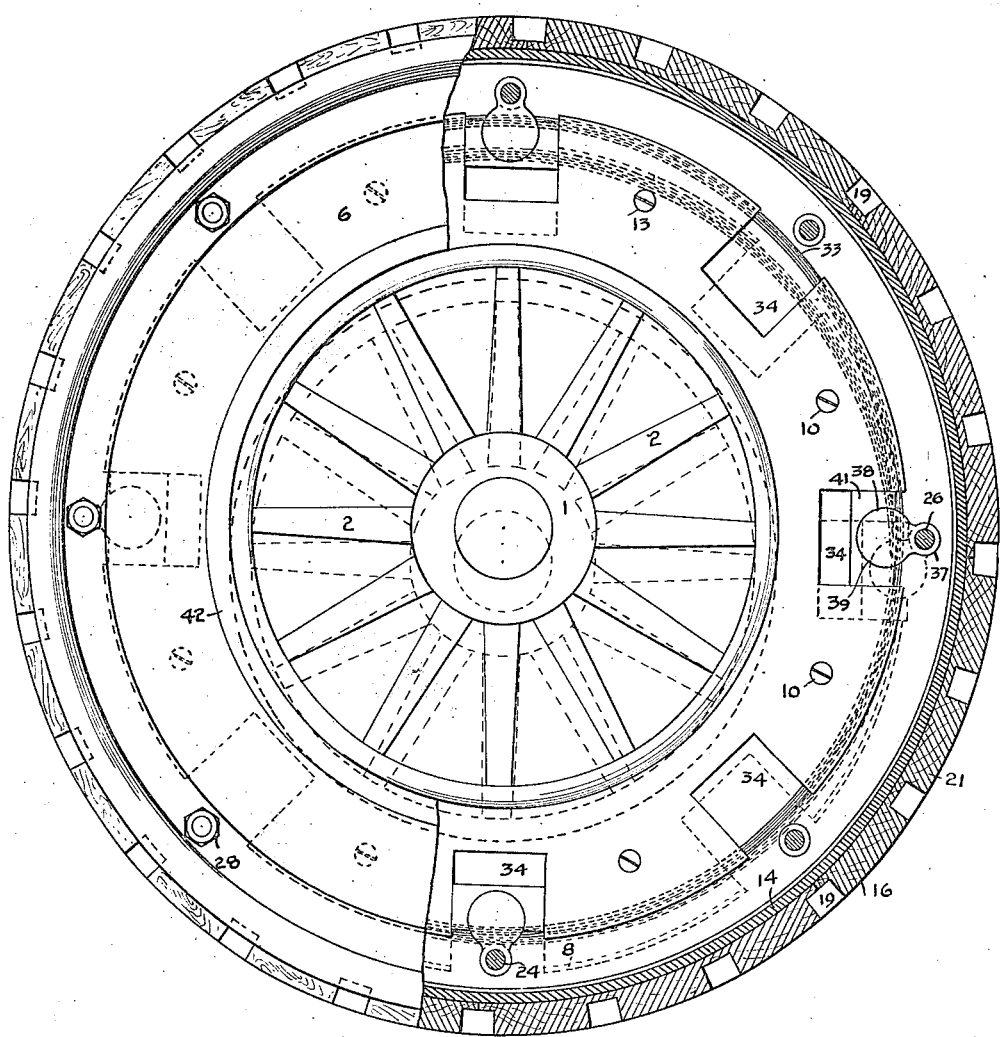
Figure 2:
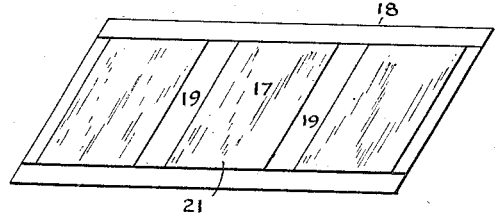

In the accompanying drawings, Figure 1 is a side view of a wheel constructed in accordance with my invention; Fig. 2 is a plan view of a portion of the wheel; Figs. 3 and 4 are transverse sections on an enlarged scale on the lines 3—3 and 4—4 respectively of Fig. 5; Fig. 5 is a longitudinal section of a portion of a wheel; Fig. 6 is a detail side view of springs.

Referring to the drawing, 1 indicates the hub of a wheel from which radiate spokes 2, here shown as being made of pressed metal, although they may also be made of wood. Each spoke is made in two sections, the halves of the spokes on each side of the wheel being made in one piece with the corresponding half of an inner felly section 3, each half of the inner felly section being formed with a circular shoulder 4. The two halves of the spokes and also of the inner felly section are seamed together in the manner now practised in this art. Closely contacting with said inner felly sections and resting against said shoulders 4 are outer felly sections 6, also in two halves. Each outer felly section comprises an annular flat portion 7 contacting with the inner felly section 3 on the same side of the wheel and a cylindrical portion or flange 8 in one piece with the portion 7. The portions 7 of the outer felly sections are secured to the inner felly sections 3 by means of screws 9, having conical heads 10 contained in conical holes 11 in the outer felly sections 7, said screws passing through holes in the inner felly sections 3 and being screwed into the threaded ends of spacers 13, which space the inner felly sections from each other while the screws 9 secure them together. In this way a strong, substantial and light wheel is formed. Said wheel is provided with a resilient tire of the following construction.

Around an annular metal rim 14 is a tread 16 formed of wood, having a central portion 17 of much greater thickness than its marginal portions 18, said central portion being, by means of obliquely extending grooves 19, formed into obliquely extending ribs 21. These ribs 21 being oblique to the axis of the wheel prevent slipping of the wheel in a direction transverse to the ribs, and by arranging that the wheels on opposite sides of the car have their ribs extending obliquely in opposite directions across the rims of the wheels, any tendency of the wheel on one side to slip will be counteracted by the ribs of the wheel of the other side extending in a direction opposing said tendency. The inner surfaces of the marginal portions of the rim 14 are tapering or wedge-shaped in form, and lying closely adjacent to the inner surfaces of said marginal portions of the rim are flanges 22 extending outwardly from annular casing plates 23. Said casing plates, rim and tread are all secured very firmly together by means of spacers 24, which have reduced portions 26 terminating in shoulders 27 fitting against the inner surfaces of said casing plates 23. Nuts 28 are screwed on the outer threaded ends of said spacers and clamp, between themselves and the shoulders 27, the casing plates 23 and clamping rings 29 having annular channel-shaped portions 31. The sides of the channels in said channel-shaped portions 31 taper toward the bottom, so that, as said channel-shaped portions 31 are pressed inwardly by the screwing-up of said nuts 28, the flanges 22 of the casing plates 23, the rim 14, and the marginal portions 18 of the tread are all clamped or wedged very firmly together, thus forming the tire of the wheel.

The wheel is resiliently supported within the tire by means of a number, here shown as four, of concentric flat springs 33, each bent into a circular form with its ends chamfered and overlapping, and contained one within the other. The number of springs so used for each wheel will vary according to the load to be sustained by the wheel. These springs are contained in the space between the outer felly sections 6 and the spacers 13 and 24. The wheel is enabled to communicate its load resiliently to the tire through the springs 33 by reason of the fact that, opposite to the spacers 24, both the flat annular portions 7 and the cylindrical portions 8 of the inner felly section are cut away, as shown at 34, so that at the bottom of the wheel the springs 33 rest upon said spacers 24, while the cylindrical portions 8 of the inner felly section, at the bottom of the wheel, descend on each side of the spacer 24 at the bottom. In other words, except for the resistance of the springs 33, the spacers 24 are free to move into and out of the recesses 34 formed in the inner felly section. The load upon the wheel is transmitted to the tire through, first the hub, then the spokes, then the spacers 13, then the springs 33, and transmission thereby becoming resilient, then the spacers 24, then the clamping rings 29 and then the tread 24.

In order to be able to transmit the driving power from the axle to the periphery of the wheel and at the same time to permit the axle to be thus resiliently supported by the tire, there are pivoted upon the reduced portions 26 of the spacers 24 drivers 36, having loops 37 surrounding said reduced portions 26 and circular portions 38 extending from said loops and fitting in circular recesses 39 in rectangular plates 41, which can slide in a radial direction in said recesses 34 which are rectangular. It will be seen that these drivers transmit a circumferential movement from the felly of the wheel to the tire, while at the same time they do not interfere with the vertical reciprocation of said felly relatively to said tire and therefore do not impair the resiliency of the wheel. The recesses 34 are sufficiently deep to permit reciprocation of each plate 41 to the full extent necessary to permit resiliency of the wheel.

In order to exclude dust and dirt from the drivers 36, the rectangular plates 41, their bearings and other parts of the tire, when moved relatively to the wheel, said casing plates 23 are formed at their inner edges with annular grooved portions 42 in which are contained packings 43 of felt or other suitable packing material, which constantly bear against the sides of the inner felly sections.

I claim:

1. In combination, a tire having at angular intervals supporting devices, a wheel having at angular intervals devices by which it can be supported, and a band of spring metal in a circular form having relatively movable ends around and supporting the latter devices, and within, and supported by the former devices.

2. The combination of a wheel having at uniform intervals around its circumference transversely extending devices for transmitting its weight and having recesses intermediate of said devices, a spring band in circular form and having relatively movable ends, and surrounding the whole of said devices, and a tire surrounding the wheel having transversely extending devices registering with said recesses and supporting said band.

3. In a resilient wheel, the combination of a felly, an annular rim, annular casing plates having flanges secured to the marginal portions of said rim, spacers between said casing plates having portions reduced in diameter and threaded ends, nuts on said threaded ends securing said casing plates to said rim, a circular flat spring having adjacent ends and interposed between a portion of the felly and the spacers, drivers pivoted on said reduced portions of the spacers, and plates slidable radially relative to the felly in which said drivers are rotatably contained.

4. In a resilient wheel, the combination of a felly, an annular rim, annular casing plates having flanges secured to the marginal portions of said rim, spacers between said casing plates having portions reduced in diameter and threaded ends, nuts on said threaded ends securing said casing plates to said rim, concentric circular flat springs having overlapping ends and interposed between a portion of the felly and the spacers, drivers pivoted on said reduced portions of the spacers, and plates slidable radially relative to the felly in which said drivers are rotatably contained.

5. In a resilient wheel, the combination of spokes, inner felly sections secured thereto, outer felly sections each comprising an annular flat portion contacting with the inner felly section on the same side of the wheel and a cylindrical portion, spacers between said inner felly sections on opposite sides of the wheel, screws securing said outer felly sections to said inner felly sections and to said spacers, an annular rim, annular casing plates having flanges secured to the marginal portions of said rim, spacers between said casing plates having portions reduced in diameter and threaded ends, nuts on said threaded ends securing said casing plates to said rim, concentric circular flat springs having overlapping ends and interposed between the first-named and the last-named spacers, drivers pivoted on said reduced portions of the spacers, and plates slidable radially relative to outer felly sections in which said drivers are rotatably contained.

6. A wheel tire comprising a rim, a tread around said rim, cheek plates adjacent to the sides of the wheel and having outwardly extending flanges, clamping plates having annular channel-shaped portions, the flanges of the cheek plates and the marginal portions of the rim and tread being received in said channels, bolts connecting the clamping plates and cheek plates together and resilient means for supporting the rim upon the bolts.

HENRY S. GRACE.